United States Patent
Ye et al.

(10) Patent No.: US 12,356,458 B2
(45) Date of Patent: Jul. 8, 2025

(54) RACH PROCEDURES FOR NON-TERRESTRIAL NETWORKS FOR USER EQUIPMENT

(71) Applicant: Apple Inc., Cupertino, CA (US)

(72) Inventors: Chunxuan Ye, Cupertino, CA (US); Dawei Zhang, Cupertino, CA (US); Haitong Sun, Cupertino, CA (US); Sigen Ye, Cupertino, CA (US); Weidong Yang, Cupertino, CA (US); Oghenekome Oteri, Cupertino, CA (US); Hong He, Cupertino, CA (US); Yushu Zhang, Cupertino, CA (US); Sarma V. Vangala, Cupertino, CA (US); Haijing Hu, Cupertino, CA (US); Chunhai Yao, Beijing (CN); Wei Zeng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,223

(22) PCT Filed: Aug. 5, 2020

(86) PCT No.: PCT/CN2020/107227
§ 371 (c)(1),
(2) Date: Sep. 24, 2021

(87) PCT Pub. No.: WO2022/027376
PCT Pub. Date: Feb. 10, 2022

(65) Prior Publication Data
US 2023/0156804 A1    May 18, 2023

(51) Int. Cl.
H04W 74/0833      (2024.01)
H04B 7/185        (2006.01)
(Continued)

(52) U.S. Cl.
CPC .... *H04W 74/0833* (2013.01); *H04B 7/18563* (2013.01); *H04L 5/0091* (2013.01); *H04W 74/002* (2013.01)

(58) Field of Classification Search
CPC ......... H04W 74/0833; H04W 74/0866; H04W 74/002; H04W 74/004; H04W 74/006;
(Continued)

(56) References Cited

U.S. PATENT DOCUMENTS

2013/0265866 A1 * 10/2013 Yi ....................... H04W 74/006
                                                    370/216
2016/0309475 A1 * 10/2016 Wong ................ H04W 72/0453
(Continued)

FOREIGN PATENT DOCUMENTS

CA    3099927 A1 * 11/2019 ............. G16Y 30/00
CN    106028407 A    10/2016
(Continued)

OTHER PUBLICATIONS

International Preliminary Report on Patentability received for PCT Patent Application No. PCT/CN2020/107227, mailed on Feb. 16, 2023, 6 pages.
(Continued)

*Primary Examiner* — Kevin D Mew
(74) *Attorney, Agent, or Firm* — Kubota & Basol LLP

(57) ABSTRACT

Methods and systems to enhance NR RACH procedure to accommodate non-terrestrial networks (NTN) are disclosed. The length of the RAR window may be extended. A NTN-RNTI associated with the time-frequency resources used for the PRACH preamble may be used to scramble the CRC of DCI used for downlink assignment in the RAR. The DCI content may include information on the associated PRACH preamble to assist the UE in distinguishing between RARs generated as a response to PRACH preambles transmitted by
(Continued)

different UEs from different system frames. The NTN-RNTI may contain information on the system frames when the UE sends the PRACH preamble. The RA-RNTI associated with the time-frequency resources used for the PRACH preambles transmitted from different frames may be used to scramble different subsets of the CRC of the DCI format 1_0 to assist the UE in distinguishing between RARs generated in response to the different PRACH preambles.

17 Claims, 12 Drawing Sheets

(51) Int. Cl.
*H04L 5/00* (2006.01)
*H04W 74/00* (2009.01)

(58) Field of Classification Search
CPC . H04W 74/008; H04B 7/185; H04B 7/18563; H04L 5/0091; H04L 5/0092; H04L 5/0094; H04L 5/0096
See application file for complete search history.

(56) References Cited

U.S. PATENT DOCUMENTS

| | | | | |
|---|---|---|---|---|
| 2016/0309506 | A1* | 10/2016 | Lim | H04W 74/006 |
| 2017/0094688 | A1* | 3/2017 | Lee | H04W 4/70 |
| 2018/0376428 | A1* | 12/2018 | Lin | H04W 52/50 |
| 2020/0008240 | A1* | 1/2020 | Golitschek Edler von Elbwart | H04L 1/0063 |
| 2020/0100298 | A1* | 3/2020 | Pan | H04W 76/27 |
| 2020/0107275 | A1* | 4/2020 | Cho | H04W 52/50 |
| 2020/0351955 | A1* | 11/2020 | Jeon | H04W 80/02 |
| 2021/0029658 | A1 | 1/2021 | Mahalingam et al. | |
| 2021/0212129 | A1 | 7/2021 | Zhang et al. | |
| 2021/0360697 | A1 | 11/2021 | Wu et al. | |
| 2022/0046552 | A1* | 2/2022 | Xu | H04L 1/189 |
| 2022/0086765 | A1* | 3/2022 | Zhang | H04W 52/16 |
| 2022/0124622 | A1* | 4/2022 | Islam | H04W 72/20 |

FOREIGN PATENT DOCUMENTS

| | | | | |
|---|---|---|---|---|
| CN | 106686691 A | | 5/2017 | |
| CN | 111478757 A | | 7/2020 | |
| WO | WO-2018232123 A1 * | | 12/2018 | H04L 27/0006 |
| WO | 2019/195457 A1 | | 10/2019 | |
| WO | WO-2019235897 A1 * | | 12/2019 | H04W 24/08 |
| WO | 2020/063683 A1 | | 4/2020 | |
| WO | 2020126892 A1 | | 6/2020 | |
| WO | WO-2020151754 A1 * | | 7/2020 | H04L 5/0005 |
| WO | WO-2020126892 A9 * | | 8/2020 | H04W 72/0446 |
| WO | WO-2021067784 A1 * | | 4/2021 | H04W 74/0833 |
| WO | WO-2021202724 A1 * | | 10/2021 | H04B 7/0408 |

OTHER PUBLICATIONS

International Search Report and Written Opinion received for PCT Patent Application No. PCT/CN2020/107227, mailed on May 8, 2021, 7 pages.
Office Action received for Japanese Patent Application No. 2023-506080, mailed on Dec. 21, 2023, 15 pages (7 pages of English Translation and 8 pages of Original Document).
Qualcomm Incorporated. "RNTI design for msgB" R2-1916060, 3GPP TSG-RAN WG2 Meeting #108, Nov. 22, 2019, pp. 1-3.
Vivo. "RA-RNTI Calculation for Extended RAR Window" R2-1905621, 3GPP TSG-RAN WG2 Meeting #106, May 17, 2019, pp. 1-4.
ZTE Corporation, et al. Consideration on RAR window configuration in NTN R2-1906113, 3GPP TSG RAN WG2 Meeting #106, May 17, 2019, pp. 1-3.
ZTE, "Report of Email Discussion [107#60 [NR/NTN] RACH capacity evaluation and procedures", ,3GPP TSG RAN WG2 #107bis R2-1912664, Oct. 18, 2015.
Ericsson, "On physical layer control procedures for NTN", 3GPP TSG-RAN WG1 Meeting #98, R1-1909507, Prague, Czech Republic, Aug. 26-30, 2019, 14 pages.
Huawei, HiSilicon, "Discussion on timing advance and RACH for NTN", 3GPP TSG RAN WG1 Meeting #97, R1-1905994, Reno, USA, May 13-17, 2019, 10 pages.
Office Action received for Japanese Patent Application No. 2023-506080, mailed on Jul. 26, 2024, 13 pages (6 pages of English Translation and 7 pages of Original Document).
Examination Report received for Indian Patent Application No. 202317002873, mailed on May 28, 2024, 6 pages.
Nokia, "Doppler Compensation, Uplink Timing Advance and Random Access in NTN", 3GPP TSG RAN WG1 #99 R1-1913017, Nov. 18-22, 2019, pp. 1-28.
Supplementary European Search Report and Search Opinion received for European Application No. 20948360.1, mailed on Apr. 3, 2024, 7 pages.
Search Report received for Chinese Patent Application No. 202080104335.1, mailed on Feb. 28, 2025, 5 pages (2 pages of English Translation and 3 Pages of Official Copy).

* cited by examiner

RACH PROCEDURES FOR NON-TERRESTRIAL NETWORKS FOR USER EQUIPMENT

RELATED APPLICATIONS

The present application is the national phase of International Application No. PCT/CN2020/107227, filed on Aug. 5, 2020 and the disclosure of which is hereby incorporated herein by reference in its entirety.

FIELD

This disclosure relates to the field of wireless communication, and more specifically, to methods and systems that enable wireless communication devices to perform random access channel (RACH) procedures to non-terrestrial networks. Other aspects are also described.

BACKGROUND

As the number of mobile devices connected to wireless networks and the demand for mobile data traffic continue to increase, changes are made to system requirements and architectures to meet current and anticipated burgeoning demand. For example, wireless communication networks such as the 5G new radio (NR) systems may need to be deployed using satellites as parts of a non-terrestrial network (NTN). In one deployment scenario of a NTN, a satellite referred to as a transparent satellite may act as a relay station to link user devices with a ground-based base station and the 5G core network by implementing a transparent payload. In another deployment scenario, a satellite referred to as a regenerative satellite has onboard processing capability to perform the functions of a base station by implementing a regenerative payload between the user devices and the ground-based 5G core network. Due to the wide coverage area of the satellites and the long distances between the satellites and the terrestrial user devices, the difference in propagation delays between two user devices within the beam footprint is greater than that encountered in strictly terrestrial networks. For example, for a NTN deploying satellites in a geosynchronous earth orbit (GEO), the maximum differential delay between points at a nadir and edge of the coverage may be 10.3 ms. For a NTN deploying satellites in a low earth orbit (LEO), the maximum differential delay may be 3.12 ms and 3.18 ms for 600 km and 1200 km altitude, respectively.

The large propagation delay of a user device and the large difference in propagation delays between user devices in the beam footprint may cause problems when the user devices execute a contention-based RACH procedure to gain initial access to the NTN. A user device may initiate the RACH procedure by sending a physical random access channel (PRACH) transmission to a base station. The user device sends the PRACH transmission as a preamble during a system frame using time-frequency resources that are uniquely associated with a random access radio network temporary identifier (RA-RNTI) of the user device. In response to the PRACH, the base station may send a random access response (RAR) with a cyclic redundancy check (CRC) scrambled by the RA-RNTI of the user device to identify the RAR as intended for the user device. The user device may search for the RAR in a common search space and may decode the RAR using its RA-RNTI. When the user device successfully receives the RAR, the user device may transmit using resources granted by the RAR to attempt to gain access to the network.

The common search space, referred to as a RAR window, during which the user device searches for the RAR may not be long enough to accommodate the maximum differential delay for user devices executing the RACH procedure in a NTN. If the RAR window is extended, there may be ambiguities in decoding the RAR due to multiple user devices transmitting the PRACH using identical time-frequency resources in different system frames. Multiple RARs within the RAR window may have their CRC scrambled by the same RA-RNTI, making it difficult for a user device to determine if it is the intended recipient of the RAR. Other complications may include determining whether and how to delay a start of the RAR window due to the long maximum propagation delay.

SUMMARY

Methods and systems to enhance NR RACH procedure to accommodate non-terrestrial networks (NTN) are disclosed. Modifications may be made to the RACH procedure from the user equipment (UE) or from the base station, referred to as 'gNodeB' or 'gNB' of 5G NR. The start of the RAR window and the length of the RAR window may be extended depending on the range of propagation delays (e.g., LEO or GEO satellites). When the length of the RAR window is extended, a NTN-RNTI associated with the time-frequency resources used for the PRACH preamble may be used to scramble the CRC of the downlink control information (DCI) format 1_0 used for downlink assignment in the RAR. The DCI format 1_0 content may include information on the associated PRACH preamble to assist the UE in distinguishing between RARs generated as a response to PRACH preambles transmitted by different UEs from different system frames. In one aspect, the NTN-RNTI may contain information on the system frames when the UE sends the PRACH preamble. In one aspect, RA-RNTI associated with the time-frequency resources used for the PRACH preambles transmitted from different frames may be used to scramble different subsets of the CRC of the DCI format 1_0 to assist the UE in distinguishing between RARs generated in response to the different PRACH preambles.

In one aspect, the UE may perform blind retransmissions of the PRACH preamble to indicate the extension of the RAR window. In one aspect, the UE may change the RAR window offset that determines the start of the RAR window from the end of the PRACH preamble transmission based on the knowledge of the location information and thus the propagation delay of the UE.

In one aspect, the gNB may perform blind retransmissions of the RAR within the RAR window to improve transmission reliability for NTN. The number of blind retransmission and the transmission pattern may depend on the PRACH reception condition, an uplink channel condition, or may be pre-configured. In one aspect, the gNB may extend the K1 value and K2 value that determine the delays between uplink and downlink transmissions to align the time domain duplex (TDD) uplink-downlink configuration due to the long propagation delays associated with the NTN. In one aspect, the gNB may broadcast or multicast RAR window size extension values to the UEs based on the orbital altitude of the satellites The above summary does not include an exhaustive list of all aspects of the present disclosure. It is contemplated that aspects of the disclosure include all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
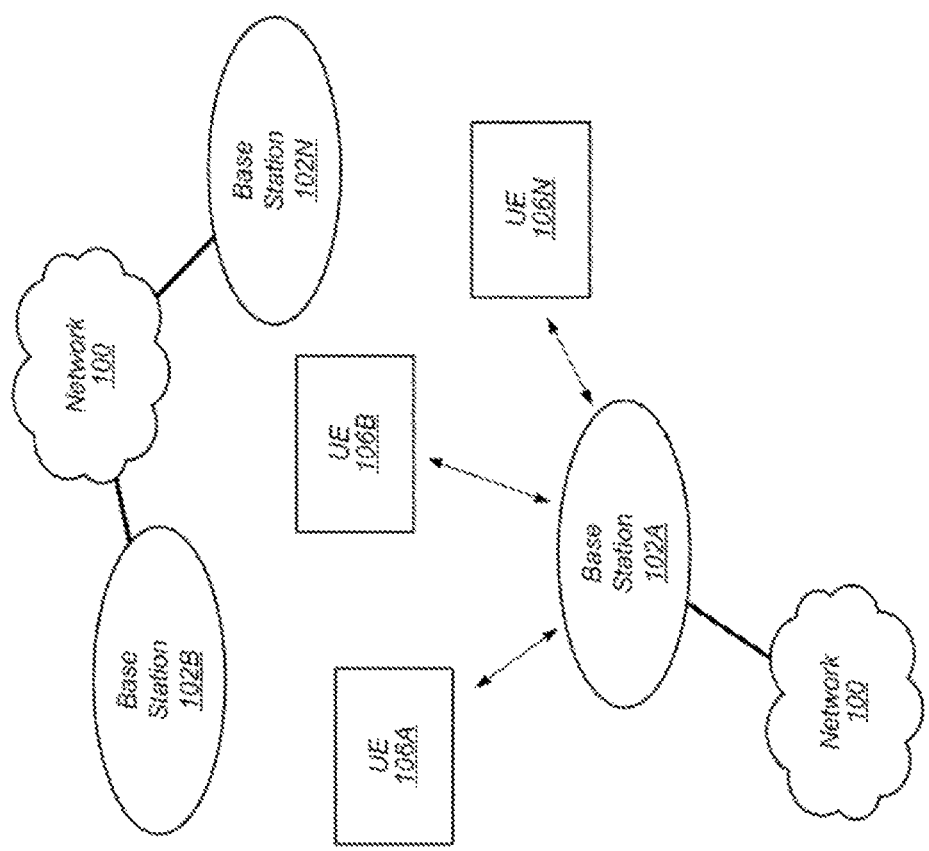
FIG. 1 illustrates an example wireless communication system in accordance with some aspects of the disclosure.

Disclosed are techniques to enhance NR RACH procedure to accommodate non-terrestrial networks (NTN) or other networks with long propagation delays. The start of the RAR window and the length of the RAR window used for the RACH procedure may be extended depending on the range of propagation delays (e.g., LEO or GEO satellites). The RNTI associated with the time-frequency resources used for the PRACH preamble and the frame number of the transmission of the PRACH by a UE may be used to scramble the CRC of DCI format 1_0 in the RAR to assist the UE in distinguishing between the RAR for the UE from RARs generated as a response to PRACH preambles transmitted by other UEs during different system frames.

In one aspect, a method for accessing a communication network by a UE is disclosed. The method includes the UE transmitting to a base station, such as a gNB of 5G NR, a PRACH preamble during a frame to request access to the communication network. The time-frequency resources of the frame used for transmitting the PRACH preamble is uniquely associated with a RNTI of the UE. The method also includes the UE determining during a RAR window that spans a number of frames whether a RAR message received from the base station is intended for the UE. The RAR message may be generated by the base station based on the RNTI and a frame number of the frame used by the UE for transmitting the PRACH preamble. The method further includes the UE contending for resources of the communication network when the UE determines that the RAR message is intended for it.

In one aspect, a method for granting access to a communication network by a base station, such as a gNB of 5G NR to a request from a UE is disclosed. The method includes the base station receiving from the UE a PRACH preamble during a frame to request access to the communication network. The time-frequency resources of the frame used for transmitting the PRACH preamble is uniquely associated with a RNTI of the UE. The method also includes the base station determining the RNTI from the time-frequency resources of the frame used for carrying the PRACH preamble. The method further includes the base station transmitting during a RAR window that spans a number of frames a RAR message to allow the UE to determine that the RAR message is intended for the UE. The RAR message may be generated by the base station based on the RNTI and the frame number of the frame used to carry the PRACH preamble.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the aspects of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N. In one aspect, the base station 102A may be deployed as a satellite, referred to as a regenerative satellite, that carries onboard processing capability to perform the functions of a base station to implement a regenerative payload between the UEs and a ground-based core network.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB.'

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible. A UE 106 may measure the time of arrival (TOA) of positioning reference signals (PRS) transmitted by its serving base station 102A and by base stations 102B-N of the neighboring cells to support position determination of UE 106.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
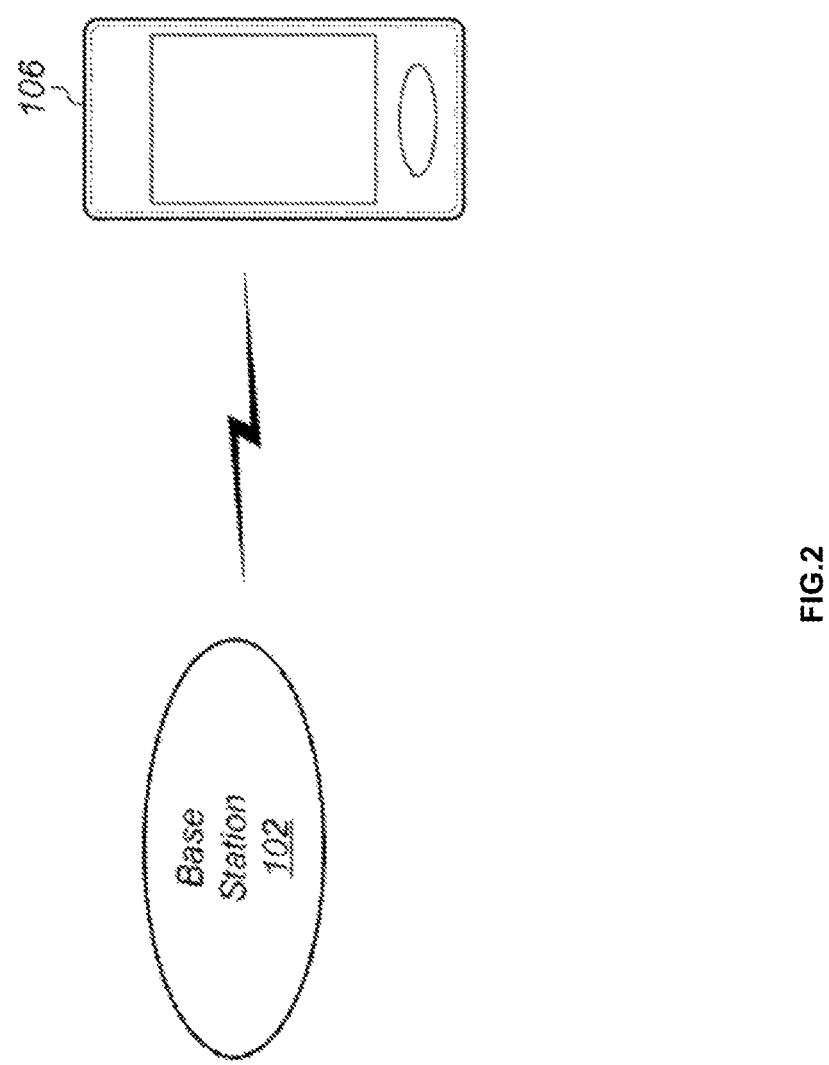
FIG. 2 illustrates a base station (BS) in communication with a user equipment (UE) device in accordance to some aspects of the disclosure.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method described herein by executing such stored instructions. Alternatively, or in addition, the UE 106 may include a programmable hardware element such as an FPGA (field-programmable gate array) that is configured to perform any of the method described herein, or any portion of any of the method described herein.

The UE 106 may include one or more antennas for communicating using one or more wireless communication protocols or technologies. In some aspects, the UE 106 may be configured to communicate using, for example, CDMA2000 (1×RTT/1×EV-DO/HRPD/eHRPD) or LTE or 5G NR using a single shared radio and/or GSM or LTE or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
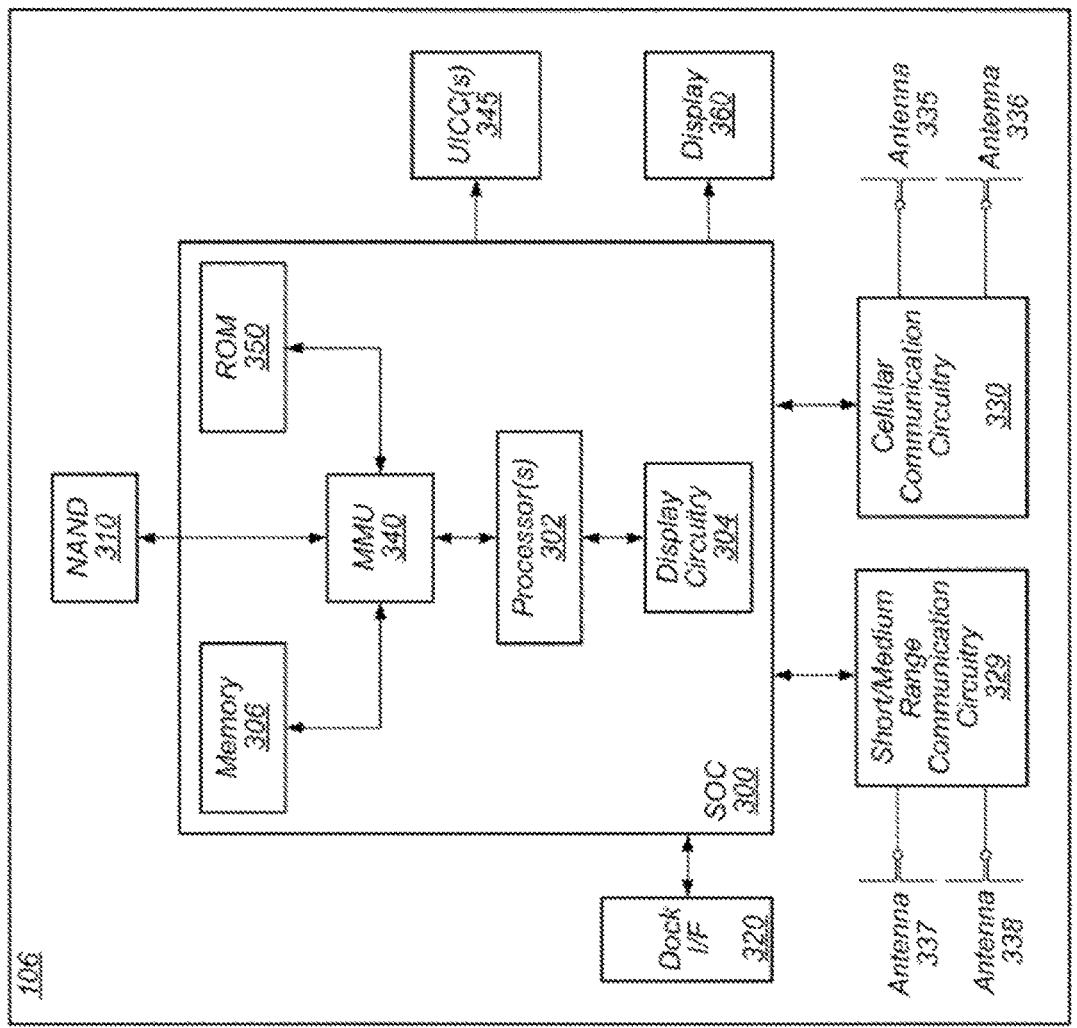
FIG. 3 illustrates an example block diagram of a UE in accordance with some aspects of the disclosure.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., BluetoothTM and WLAN circuitry). In some aspects, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below, cellular communication circuitry 330 may include dedicated receive chains (including and/or coupled to, e.g., communicatively directly or indirectly, dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA (Non-Standalone) NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
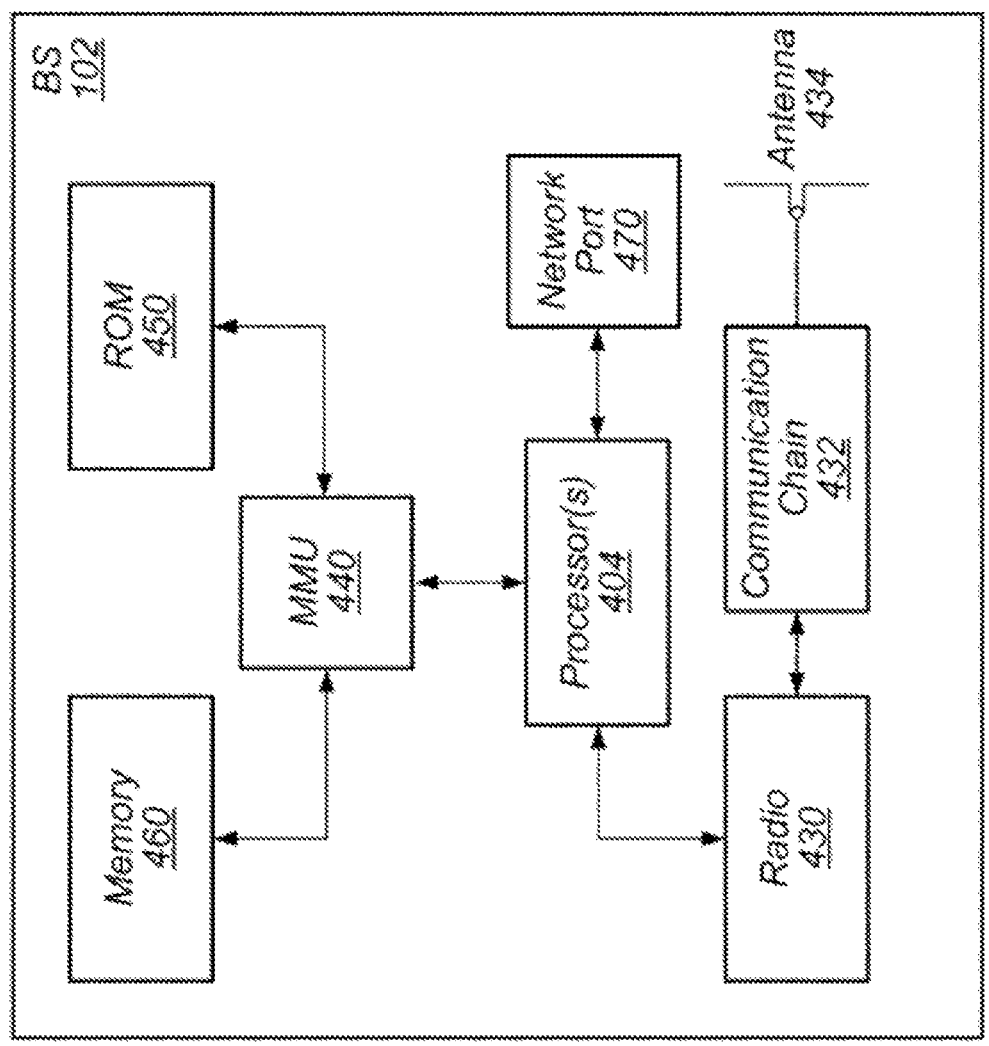
FIG. 4 illustrates an example block diagram of a BS in accordance with some aspects of the disclosure.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB's.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
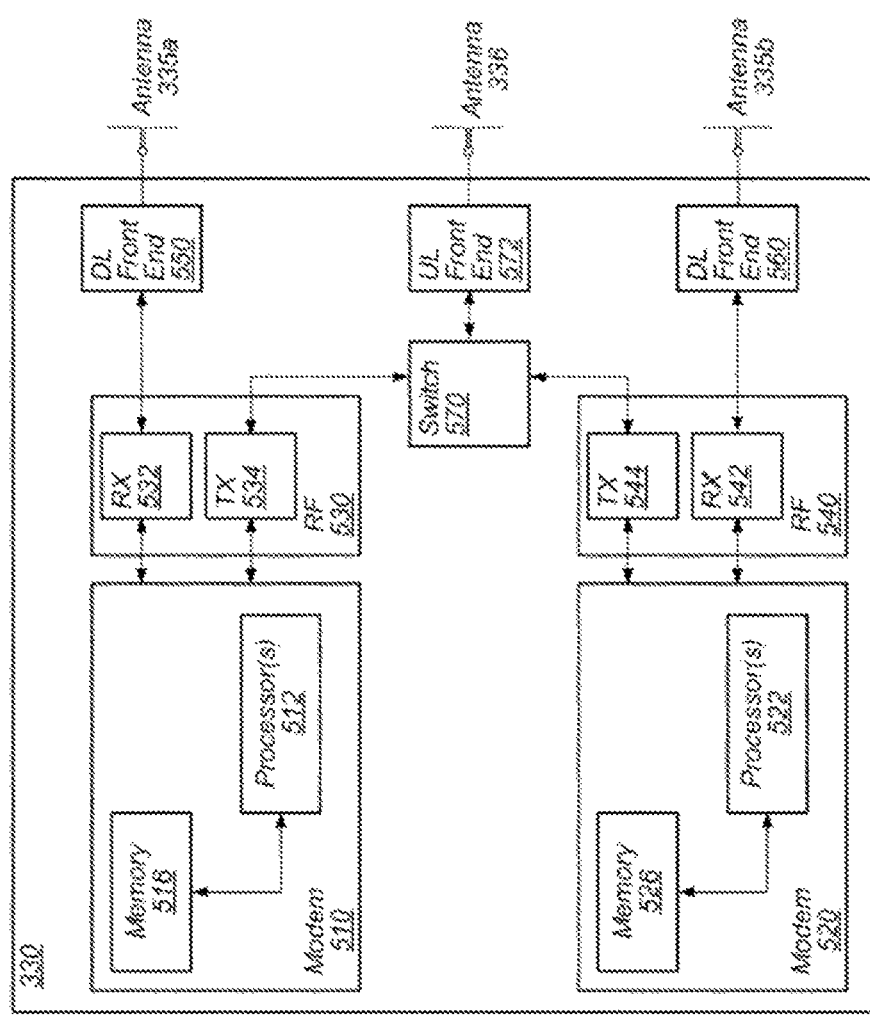
FIG. 5 illustrates an example block diagram of cellular communication circuitry in accordance with some aspects of the disclosure.

FIG. 5 illustrates an example simplified block diagram of cellular communication circuitry, according to some aspects. It is noted that the block diagram of the cellular communication circuitry of FIG. 5 is only one example of a possible cellular communication circuit. According to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some aspects, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335 a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335 b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

A UE may initiate a RACH procedure to gain access to the network. In one aspect of a 4-step contention based RACH procedure, a UE may send a PRACH to a base station in a first step. The PRACH, which may also be referred as Msg1, or a PRACH preamble, may contain 1 out of 64 preambles (long or short preambles) sent in a RACH occasion (RO). The UE may power ramp the PRACH after each failed PRACH transmission. The UE may transmit the PRACH in a frame using time-frequency resources that are uniquely associated with the RA-RNTI of the UE.

In a second step of the RACH procedure, in response to the PRACH from the UE, the base station may send the RAR, which may also be referred as Msg 2, or a RAR message. The RAR may contain DCI format 1_0 in physical downlink control channel (PDCCH) with CRC scrambled by the RA-RNTI in the common search space. The UE may decode the RAR using its RA-RNTI. The RAR may also contain media access control physical data unit (MAC PDU) carried on physical downlink shared channel (PDSCH) specified by the DCI format 1_0. The MAC subhead may contain a 6-bit random access preamble ID (RAPID) or a 4-bit backoff indicator (BI). The MAC RAR may contain a 12-bit timing advance (TA) command, 27-bit uplink grant, and 16-bit temporary cell-RNTI (TC-RNTI).

In a third step of the RACH-procedure, after the UE receives the RAR, the UE may send Msg3 on the physical uplink shared channel (PUSCH) granted by the RAR. The Msg3 may contain the C-RNTI. Retransmission of Msg3 may be scheduled by the base station using DCI format 0_0 with CRC scrambled by TC-RNTI.

In a fourth step of the RACH-procedure, after base station may send contention resolution in Msg4. The Msg4 may contain DCI format 1_0 with CRC scrambled by TC-RNTI, 48-bit UE contention resolution ID.

To expedite the RACH procedure, 5G NR introduced a 2-step RACH procedure. In a first step of the 2-step RACH procedure, the UE may send MsgA containing PRACH and PUSCH. The RACH occasion (RO) used for the PRACH and the PUSCH occasion (PO) used for the PUSCH may have fixed resource mapping. The PO map not overlap with the RO. The PUSCH may contain scrambling sequence initialization value that depends on RA-RNTI and RAPID, and radio resource control (RRC) connection request with or without additional uplink data.

In a second step of the 2-step RACH procedure, the base station may send MsgB. The UE may receive MsgB in a RAR window with either a successful RAR MAC or a fallback RAR MAC.

Figure 6:
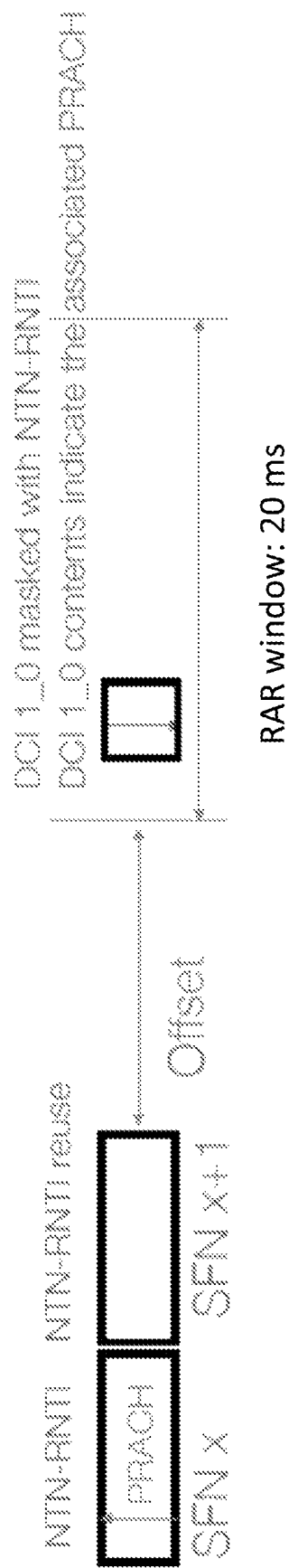
FIG. 6 illustrates a DCI field-based RAR window size extension in accordance with some aspects of the disclosure.

FIG. 6 illustrates a DCI field-based RAR window size extension in accordance with some aspects of the disclosure. The RAR window size may be extended for the 4-step RACH procedure depending on whether a satellite in NRN is an LEO satellite or a GEO satellite. For an LEO satellite, the maximum differential delay may be 3.12 ms and 3.18 ms for 600 km and 1200 km altitude. Because 2 times the maximum differential delay is less than the nominal 10 ms of the RAR window, no extension of the RAR window may be necessary. However, for a GEO satellite, the maximum differential delay between points at a nadir and edge of the coverage may be 10.3 ms. Extension of the RAR window size may be needed since 2 times the maximum differential delay is close to 20 ms.

In one aspect, if the RAR window size is extended to 20 ms for a GEO satellite, the DCI field may indicate the RAR window size extension. In Msg2 transmission, the CRC of DCI format 1_0 may be scrambled by a new NTN-RNTI in the common search space. Similar to RA-RNTI, the NTN-RNTI also depends on RACH occasion time domain starting slot index t_id, starting symbol index s_id, and frequency domain index f_id, but with an additional offset so that the NTN-RNTI is different from MsgB-RNTI of the 2-step RACH procedure. For example, the NTN RNTI may be equal to (1+s_id+14×t_id+14×80×f_id+14×80×8×ul_carrier_id+14×80×8×4). The range of NTN-RNTI may then be 35841-53760, to avoid value conflict with the range of RA-RNTI of 1-17920 and the range of MsgB-RNTI of 17921-33840. DCI format 1_0 additionally has a field to indicate the last bit of the system frame number (SFN) when the PRACH is transmitted. The UE may use the NTN-RNTI and the bit field associated with the SFN when the PRACH is transmitted to determine if the RAR received during the extended RAR window is intended for the UE.

Figure 7:
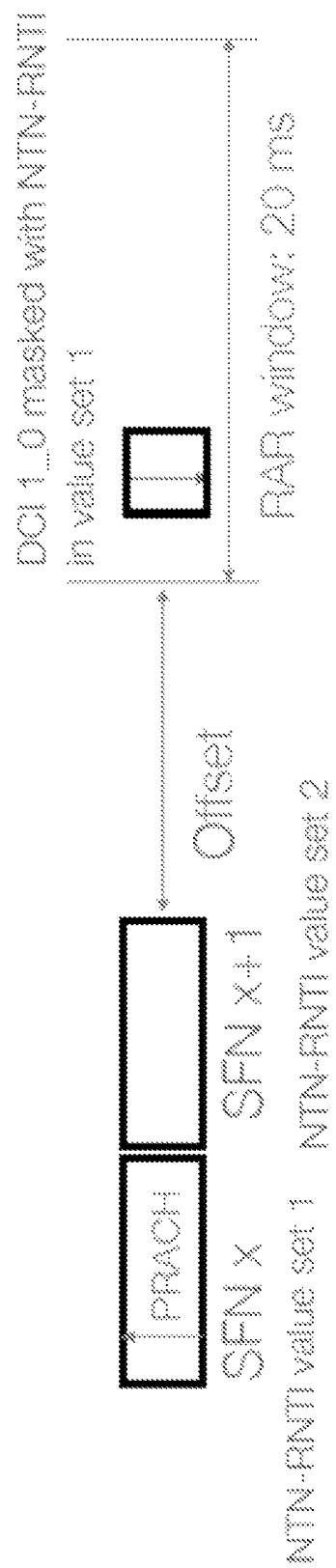
FIG. 7 illustrates a RNTI-based RAR window size extension in accordance with some aspects of the disclosure.

FIG. 7 illustrates a RNTI-based RAR window size extension in accordance with some aspects of the disclosure. Again, the RAR window size is extended to 20 ms for a GEO satellite. In Msg2 transmission, the CRC of DCI format 1_0 may be scrambled by a new NTN-RNTI in the common search space. However, unlike the DCI field-based RAR window size extension of FIG. 6, the NTN-RNTI here may encode the SFN when the PRACH is transmitted by the UE. For example, the NTN RNTI may be equal to (1+s_id+14×t_id+14×80×f_id+14×80×8×ul_carrier_id+14×80×8×4×(SFN mode 2)). The result is that if the RACH occasion is in even-numbered DFN, then NTN-RNTI reduces to RA-RNTI. On the other hand, if the RACH occasion is in odd-numbered SFN, then NTN-RNTI uses new values. This avoids the value conflict with MsgB-RNTI, but reuses the values of RA-RNTI. That is, the NTN-RNTI range may be set to [1,17920] (set 1) for even-numbered SFN, and [35841, 53760] (set 2) for odd-numbered SFN.

In one aspect, to reuse the value range of MsgB-RNTI, the NTN_RNTI may be equal to (1+s_id+14×t_id+14×80×f_id+14×80×8×ul_carrier_id+14×80×8×2×(SFN mode 2)). The range of NTN-RNTI may then be [1, 35840]. Also, unlike the DCI field-based RAR window size extension of FIG. 6, the DCI format 1_0 no longer needs to indicate the last bit of the system frame number (SFN) when the PRACH is transmitted. The UE may calculate NTN_RNTI based on its RACH occasion and the SFN when it sends PRACH, and may use the NTN-RNTI to determine if the RAR received during the extended RAR window is intended for the UE.

Figure 8:
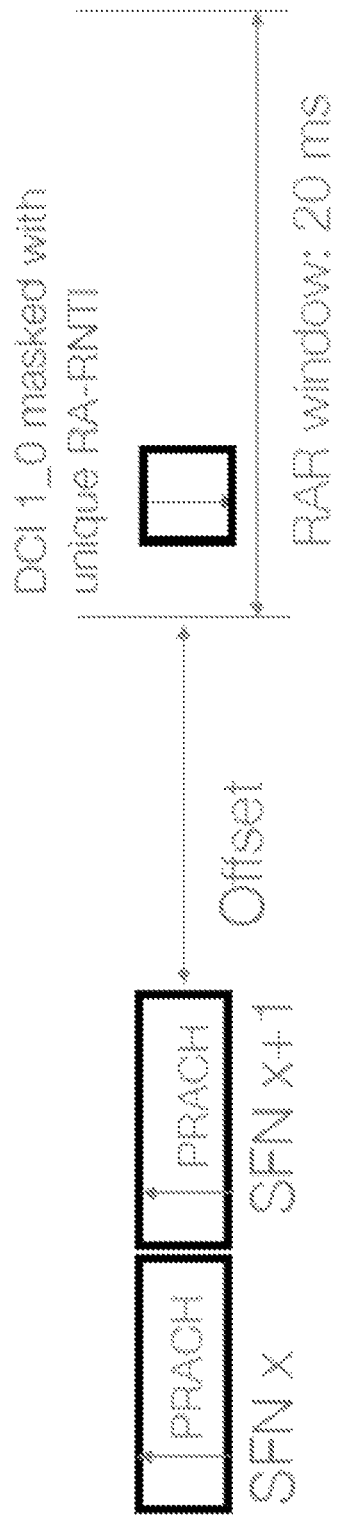
FIG. 8 illustrates PRACH blind retransmissions over multiple frame numbers by the UE to indicate extension of the RAR window size in accordance with some aspects of the disclosure.

FIG. 8 illustrates PRACH blind retransmissions over multiple frame numbers by the UE to indicate extension of the RAR window size in accordance with some aspects of the disclosure. Again, the RAR window size is extended to 20 ms for a GEO satellite. In Msg1 transmission, the UE transmits multiple (e.g., 2) PRACH transmissions in the same RACH occasion (both time and frequency domain) repeated over multiple frames. In one aspect, the transmit power of the PRACH retransmissions may be increased or remain the same. After retransmission, the preamble power ramping counter may be increased by 1 or may be increased by the number of PRACH blind retransmission. The sane RA-RNTI is obtained from each of the PRACH retransmissions. That is, RA-RNTI may be equal to (1+s_id+14×t_id+14×80×f_id+14×80×8×ul_carrier_id). In one aspect, the RACH occasions are paired among multiple (e.g., 2) consecutive frames. Each UE may wait in its own RAR window to receive the RAR message.

Figure 9:
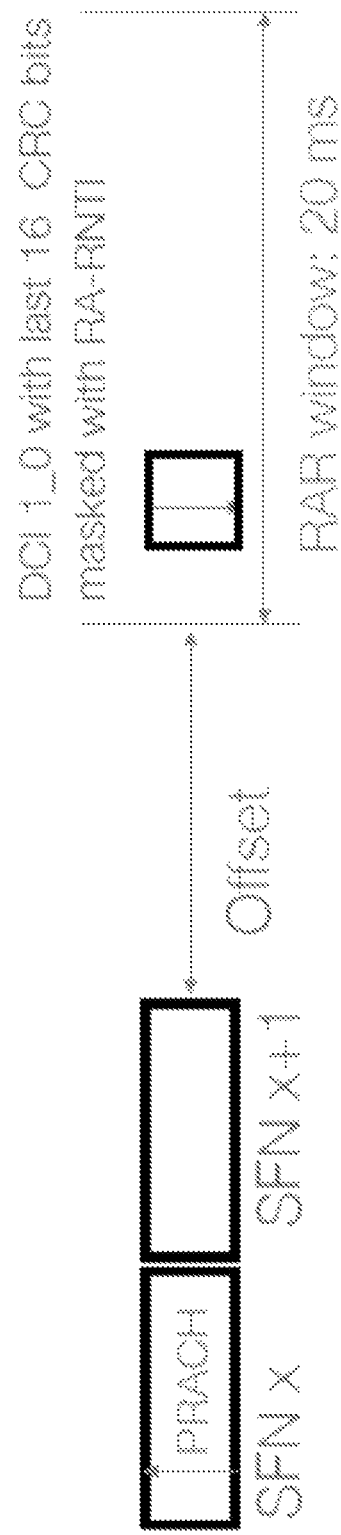
FIG. 9 illustrates the use of RA-RNTI to mask different positions of DCI in accordance with some aspects of the disclosure.

FIG. 9 illustrates the use of RA-RNTI to mask different positions of DCI in accordance with some aspects of the disclosure. Again, the RAR window size is extended to 20 ms for a GEO satellite. In one aspect, in Msg2 transmission, different subsets of CRC of DCI format 1_0 may be scrambled by RA-RNTI in the common search space depending on the frame number when the UE transmits the PRACH. RA-RNTI may be equal to (1+s_id+14×t_id+14×80×f_id+14×80×8×ul_carrier_id). If the last 16 bits of DCI format 1_0 CRC is scrambled by the RA-RNTI, also referred to as masking the last 16 CRC bits of DCI format 1_0 with RA-RNTI, then the RAR corresponds to the PRACH transmitted using RACH occasion in even-numbered SFN. If the second last 16 bits of DCI format 1_0 CRC is scrambled by the RA-RNTI, also referred to as masking the second last 16 CRC bits of DCI format 1_0 with RA-RNTI, then the RAR corresponds to the PRACH transmitted using RACH occasion in odd-numbered SFN.

In one aspect, the RAR window offset for the RACH procedure may be modified. The RAR window offset may be modified for both the 4-step RACH procedure and the 2-step RACH procedure. In one aspect, in a unified design, a common timing advance (TA) may be used as the RAR window offset for all UEs. In one aspect, a common TA may be used as the RAR window offset for all UEs without location information. The UE may send Msg1 or MsgA with the common TA. In one aspect, a full TA that accounts for the UE-specific propagation delay may be set as the RAR window offset for UEs with location information. The UE may send Msg1 or MsgA with the full TA.

In one aspect, for the 2-step RACH procedure, the base station may blindly retransmit MsgB within the RAR window that is nominally at 40 ms. For NTN, the large propagation delay may make HARQ-ACK retransmission difficult in the 40 ms RAR window. To maintain reliable transmission of MsgB in the 2-step RACH procedure, the base station may blindly retransmit MsgB with the RAR window. MsgB-RNTI may be set equal to (1+s_id+14×t_id+14×80×f_id+14×80×8×ul_carrier_id+14×80×8×2). In one aspect, the number of blind retransmissions and/or the retransmission pattern may depend on the PRACH reception condition or the PUSCH reception condition. In one aspect, the retransmission pattern may be pre-configured.

In one aspect, the base station may extend the values of K1 and K2 that determine the delays between uplink and downlink transmissions to align the time domain duplex (TDD) uplink-downlink configuration due to the long propagation delays associated with the NTN. For example, K1 may be the time gap in unit of slots between PDSCH and the corresponding PUCCH with HARQ feedback. The maximum value of K1 may be nominally 15 slots. K2 may be the time gap in unit of slots between DCI reception and the corresponding PUSCH. The maximum value of K2 may be nominally 32 slots. In NTN, an additional offset may be added to the PUSCH or PUCCH transmission. Depending on the additional time offset, the resulting slot for PUSCH or PUCCH transmission may coincide with a downlink slot. In one aspect, to align the delayed PUSCH or PUCCH transmissions with uplink slots, the maximum value of K1 may be extended to 31 slots and the maximum value of K2 may be extended to 64 slots.

In one aspect, the base station may broadcast new RAR window values to the UEs to extend the RAR window size based on if the satellite is an LEO, GEO, or others. In one aspect, the base station may broadcast the new RAR window values using SIB1. In one aspect, a new SIB1 information element may be used or a current information element such as RACHConfigCommon IE may be used by adding a new element for NTN.

In one aspect, the new RAR window values may be set to the same value. In one aspect, the RAR window values may be set based on the tracking area, which may be linked to the type of satellites used. In one aspect, the RAR window value may be set based on the current load and network processing capabilities to ensure that other parameters are also appropriately extended. This may include an estimation of how long the delay in response from the network may be for MsgB in the 2-step RACH procedure or for Msg2/4 in the 4-step RACH procedure and what actions the UE may take during the intermediate sleep duration.

In one aspect, the base station may multicast the new RAR window size values using page messages. Since the page message is less frequent compared to the SIB1, the network may not be able to handle significant spikes in the network access traffic. The page message size also needs to be increased to include additional information for the new RAR window size values. However, network efficiency may be achieved because only UEs to which the page message is targeted will utilize the additional information element and not all UEs in the NTN will modify their RACH behavior. In one aspect, the page message may be restricted for only downlink traffic so that UEs that may perform the RACH procedure due to uplink traffic may not utilize this enhancement. In one aspect, any downlink page targeted at a UE may carry the new window size values instead of using of a multi-cast for all UEs. In one aspect, the page message may be restricted to UEs that satisfy a particular IMSI.

Figure 10:
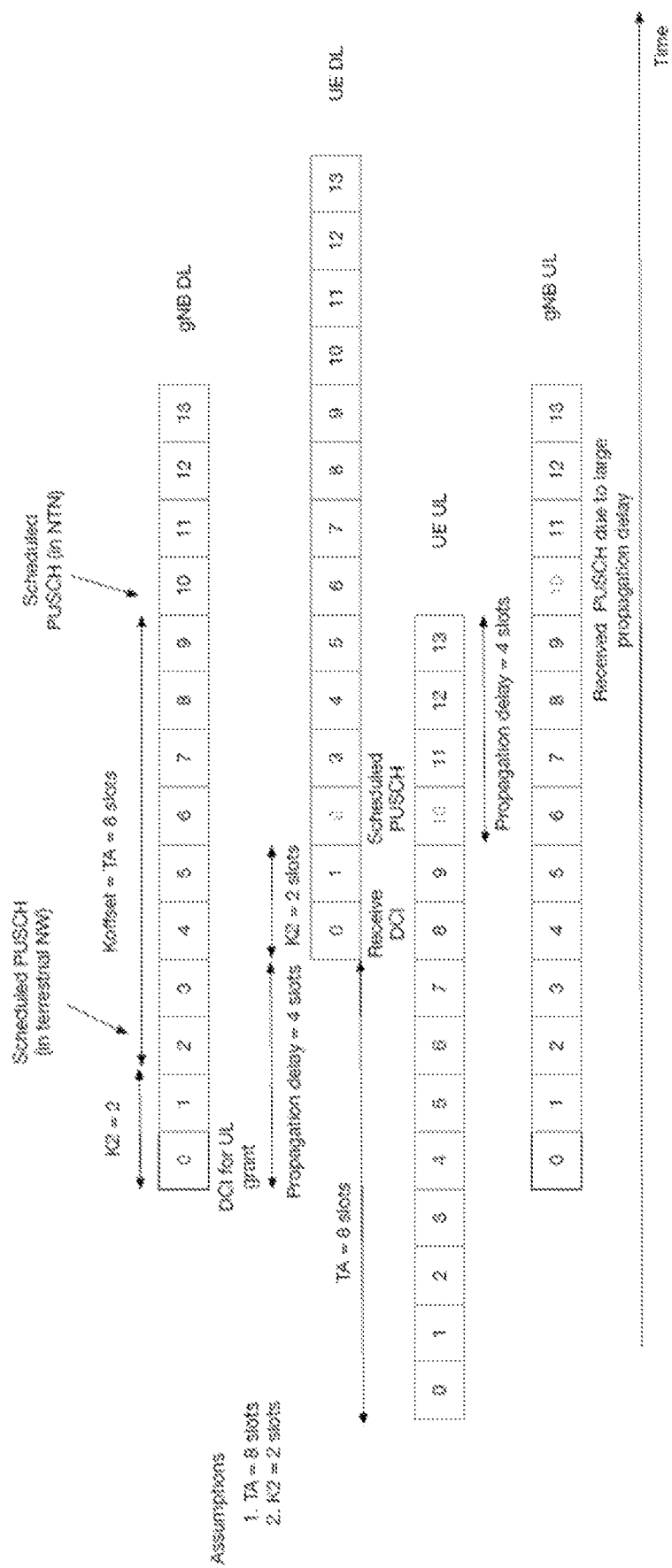
FIG. 10 illustrates a timing relationship in NTN between the base station and the UE using a timing advance adjustment for the UE based on the round trip propagation delay between the base station and the UE.

FIG. 10 is a data flow diagram illustrating an example of a method for a UE to transmit PRACH preamble to a base station and to receive a RAR message from the base station over an extended RAR window to perform the RACH procedure in accordance with some aspects of the disclosure.

At operation 1001, the UE transmits a PRACH preamble during a frame to a network, where the time-frequency resources of the frame used for transmitting the PRACH preamble is uniquely associated with an RNTI of the UE.

At operation 1003, the UE determines during a RAR window that spans a plurality of frames whether a RAR message received from the network is intended for the UE based on the RNTI and the frame number of the frame used for transmitting the PRACH preamble.

At operation 1005, the UE contends for resources of the communication network in response to determining that the RAR message is intended for the UE.

Figure 11:
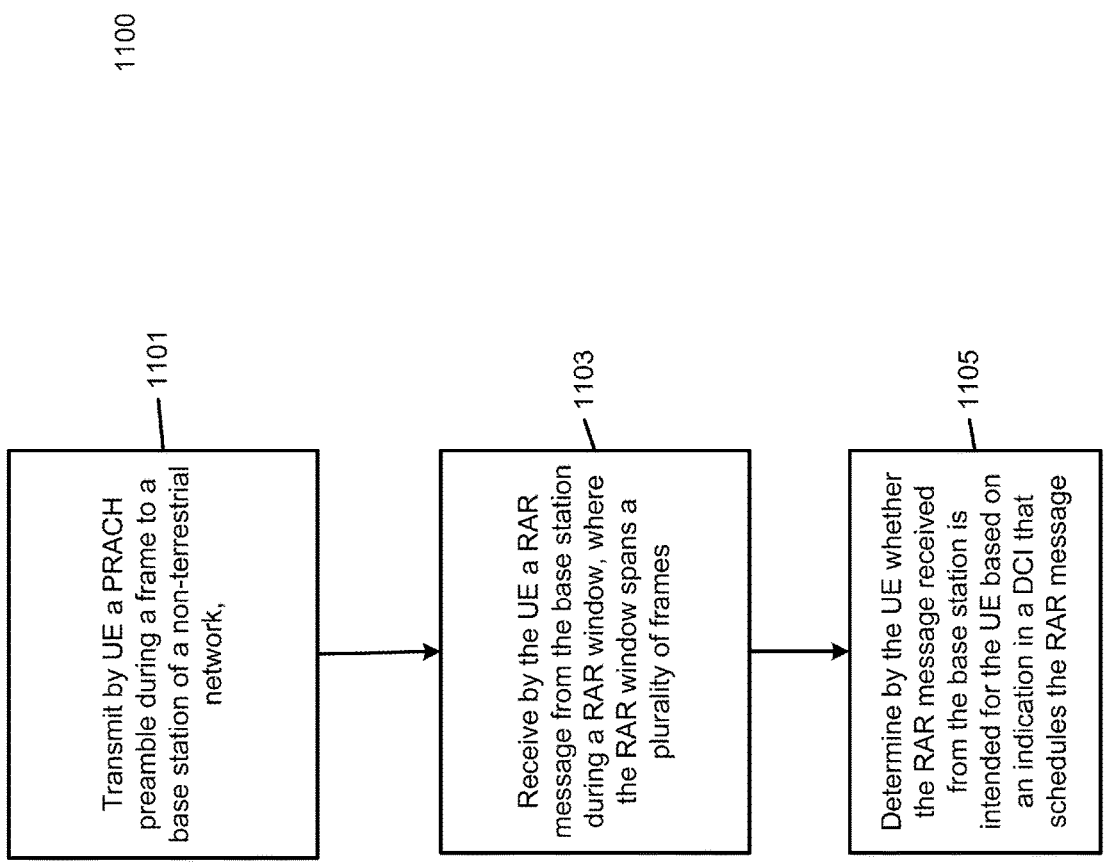
FIG. 11 is a data flow diagram illustrating an example of a method for a UE to transmit PRACH preamble to a base station and to receive a RAR message from the base station over an extended RAR window to perform the RACH procedure in accordance with some aspects of the disclosure.
Figure 12:
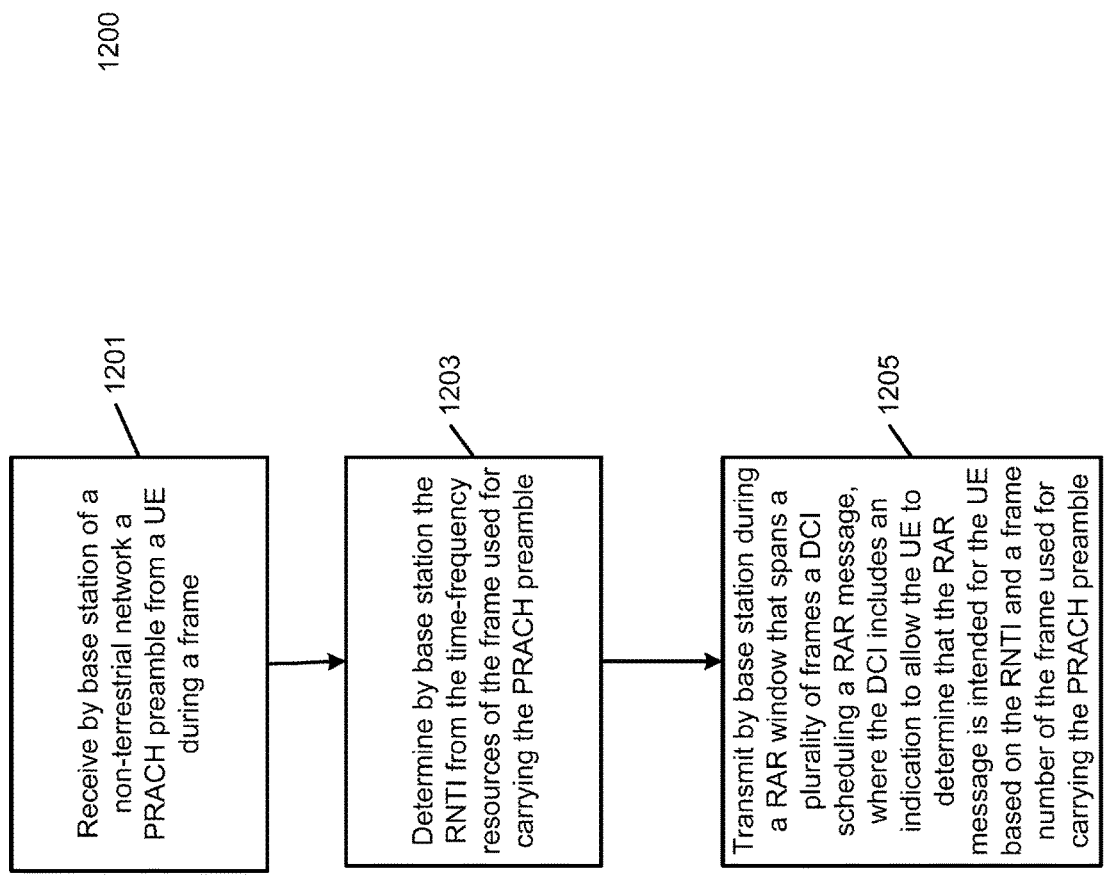
FIG. 12 is a flow diagram illustrating an example of a method for a base station to receive PRACH preamble from a UE, to determine the RNTI, and to transmit a RAR based on the RNTI over an extended RAR window to the UE in accordance with some aspects of the disclosure.

FIG. 11 is a flow diagram illustrating an example of a method for a base station to receive PRACH preamble from a UE, to determine the RNTI, and to transmit a RAR based on the RNTI over an extended RAR window to the UE in accordance with some aspects of the disclosure.

At operation 1101, the base station receives a PRACH preamble from a UE during a frame, where the time-frequency resources of the frame used for carrying the PRACH preamble is uniquely associated with an RNTI of the UE.

At operation 1103, the base station determines the RNTI from the time-frequency resources of the frame used for carrying the PRACH preamble.

At operation 1105, the base station transmits during a RAR window that spans a plurality of frames a RAR message to allow the UW to determine that the RAR message is intended for the UE based on the RNTI and a frame number of the frame used for carrying the PRACH preamble.

Aspects of the method and apparatus described herein for enhancing the RACH procedure in a wireless communication network may be implemented in a data processing system, for example, by a network computer, network server, tablet computer, smartphone, laptop computer, desktop computer, other consumer electronic devices or other data processing systems. In particular, the operations described are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

While certain exemplary instances have been described and shown in the accompanying drawings, it is to be understood that these are merely illustrative of and not restrictive on the broad aspects of the disclosure, and that this disclosure is not limited to the specific constructions and arrangements shown and described, since various other modifications may occur to those of ordinary skill in the art. The description is thus to be regarded as illustrative instead of limiting.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of accessing a communication network by a wireless user equipment (UE), the method comprising:
   transmitting, by the UE to a base station of the communication network, a physical random access channel (PRACH) preamble during a frame of a frame structure that includes a plurality of frames to request access to the communication network;
   receiving, by the UE, a random access response (RAR) message from the base station during a RAR window, wherein the RAR window spans two frames of the frame structure; and
   determining, by the UE, whether the RAR message received from the base station is intended for the UE based on an indication in a downlink control information (DCI) that schedules the RAR message, wherein determining that the RAR message is intended for the UE comprises:
   determining, by the UE, a radio network temporary identifier (RNTI) based on time-frequency resources of the frame used for transmitting the PRACH preamble;
   detecting, by the UE, that a cyclic redundancy check (CRC) of the DCI of the RAR message is scrambled by the RNTI; and
   determining, by the UE, that a field in the DCI identifies a frame number of a triggering PRACH associated with the RAR as an even frame or an odd frame, and wherein the frame number matches with the frame used by the UE for transmitting the PRACH preamble.

2. The method of claim 1, further comprising:
   determining, by the UE, a timing advance (TA) value, wherein the TA value is adaptable to align a frame structure between the UE and the base station to account for a propagation delay between the UE and the base station.

3. The method of claim 2, wherein the TA value is determined based on location information of the UE.

4. The method of claim 2, wherein the TA value assumes the UE is at a common reference position of a coverage area of the base station.

5. The method of claim 2, wherein receiving the RAR message comprise:
   offsetting a start of the RAR window from an end of the PRACH preamble transmitted from the UE by the TA value.

6. The method of claim 2, wherein transmitting the PRACH preamble comprise:
   transmitting the PRACH preamble using the TA value to account for the propagation delay between the UE and the base station.

7. The method of claim 1, further comprising:
   receiving, by the UE from the base station, a time gap value;
   receiving, by the UE from the base station, a downlink transmission; and
   transmitting, by the UE to the base station, an acknowledgement of the downlink transmission, wherein the time gap value indicates a delay between receiving the downlink transmission and transmitting the acknowledgement of the downlink transmission.

8. The method of claim 7, wherein the time gap value is adaptable to align the acknowledgement of the downlink transmission with an uplink slot of the frame structure.

9. The method of claim 7, wherein the time gap value indicates the delay between receiving the downlink transmission and transmitting the acknowledgement of the downlink transmission as a number of slots of the frame structure.

10. The method of claim 9, wherein the delay comprises a maximum value of 31 slots.

11. The method of claim 1, wherein transmitting by the UE the PRACH preamble comprises:
    transmitting repeatedly the PRACH preamble using identical time-frequency resources of a plurality of frames of the frames structure, wherein the PRACH preamble is transmitted with increasing power over the plurality of frames.

12. Baseband circuitry, comprising:
    a memory comprising one or more instructions; and
    one or more processors configured to execute the one or more processors to cause the baseband circuitry to perform operations comprising:
    transmitting to a base station of a non-terrestrial communication network a physical random access channel (PRACH) preamble during a frame of a frame structure that includes a plurality of frames to request access to the non-terrestrial communication network;
    receiving a random access response (RAR) message from the base station during a RAR window, wherein the RAR window spans two frames of the frame structure; and
    determining whether the RAR message received from the base station is intended for a user equipment (UE) based on an indication in a downlink control information (DCI) of the RAR message wherein determining that the RAR message is intended for the UE comprises:
    determining, by the UE, a radio network temporary identifier (RNTI) based on time-frequency resources and a frame number of the frame used for transmitting the PRACH preamble, wherein the frame number is identified as an even frame or an odd frame; and
    determining, by the UE, that a cyclic redundancy check (CRC) of the DCI of the RAR message is scrambled by the RNTI.

13. The baseband circuitry of claim 12, wherein the operations further comprise:
    determine a timing advance (TA) value, wherein the TA value is adaptable to align a frame structure between the UE and the base station to account for a propagation delay between the UE and the base station.

14. The baseband circuitry of claim 13, wherein the TA value is determined based on location information of the UE.

15. A user equipment (UE) device comprising:
    at least one antenna;

at least one radio, wherein the at least one radio is configured to communicate with a base station of a non-terrestrial communication network using the at least one antenna; and at least one processor coupled to the at least one radio, wherein the at least one processor is configured to perform operations comprising:

transmitting to the base station a physical random access channel (PRACH) preamble during a frame of a frame structure that includes a plurality of frames to request access to the non-terrestrial communication network;

receiving a random access response (RAR) message from the base station during a RAR window, wherein the RAR window spans a plurality of frames of the frame structure; and determining whether the RAR message received from the base station is intended for the UE based on an indication in a downlink control information (DCI) of the RAR message wherein determining that the RAR message is intended for the UE comprises:

determining, by the UE, a radio network temporary identifier (RNTI) based on time-frequency resources of the frame used for transmitting the PRACH preamble; and detecting, by the UE, that a portion of a cyclic redundancy check (CRC) of the DCI of the RAR message is scrambled by the RNTI, wherein the portion of the CRC of the DCI scrambled is identified based on an odd frame or an even frame of the frame used by the UE for transmitting the PRACH preamble.

16. The UE of claim 15, wherein the operations further comprise:

determining a timing advance (TA) value, wherein the TA value is adaptable to align a frame structure between the UE and the base station to account for a propagation delay between the UE and the base station.

17. The UE of claim 16, wherein the TA value is determined based on location information of the UE.

* * * * *